US010994970B2

(12) United States Patent
Wiethorn

(10) Patent No.: US 10,994,970 B2
(45) Date of Patent: May 4, 2021

(54) CRANE RISK LOGIC APPARATUS AND SYSTEM AND METHOD FOR USE OF SAME

(71) Applicant: Jim D. Wiethorn, Sugar Land, TX (US)

(72) Inventor: Jim D. Wiethorn, Sugar Land, TX (US)

(73) Assignee: Jim D. Wiethorn, Sugar Land, TX (US)

( * ) Notice: Subject to any disclaimer, the term of this patent is extended or adjusted under 35 U.S.C. 154(b) by 62 days.

(21) Appl. No.: 16/555,117

(22) Filed: Aug. 29, 2019

(65) Prior Publication Data

US 2021/0032080 A1 Feb. 4, 2021

Related U.S. Application Data

(60) Provisional application No. 62/879,928, filed on Jul. 29, 2019.

(51) Int. Cl.
| | |
|---|---|
| *B66C 15/06* | (2006.01) |
| *H04Q 9/02* | (2006.01) |
| *H04W 4/021* | (2018.01) |
| *B66C 13/16* | (2006.01) |
| *B66C 23/90* | (2006.01) |
| *B66C 23/16* | (2006.01) |
| *H04L 29/08* | (2006.01) |
| *G05B 9/02* | (2006.01) |
| *B66C 23/36* | (2006.01) |

(52) U.S. Cl.
CPC ............ *B66C 15/065* (2013.01); *B66C 13/16* (2013.01); *B66C 23/905* (2013.01); *H04Q 9/02* (2013.01); *H04W 4/021* (2013.01); *B66C 23/16* (2013.01); *B66C 23/36* (2013.01); *G05B 9/02* (2013.01); *H04L 67/12* (2013.01); *H04Q 2209/40* (2013.01)

(58) Field of Classification Search
CPC .................................................. B66C 15/065
See application file for complete search history.

(56) References Cited

U.S. PATENT DOCUMENTS

| | | | |
|---|---|---|---|
| 2,477,854 A | 8/1949 | Baker | |
| 2,616,683 A | 11/1952 | Le Fevre | |
| 3,339,652 A | 9/1967 | Price | |
| 3,638,211 A | 1/1972 | Sanchez | |
| 3,641,551 A | 2/1972 | Sterner et al. | |
| 3,680,714 A | 8/1972 | Holmes | |
| 3,713,129 A | 1/1973 | Buchholz | |

(Continued)

*Primary Examiner* — Alex C Dunn
(74) *Attorney, Agent, or Firm* — Scott Griggs; Griggs Bergen LLP

(57) ABSTRACT

A crane risk logic apparatus and system and method for use of the same are disclosed. In one embodiment of the crane risk logic apparatus, the crane risk logic apparatus is integral with a crane, such as a crawler crane or a tower crane, and located in communication with a load moment indicator. The crane risk logic apparatus receives crane data from the load moment indicator and determines lift cycle data therefrom. The crane risk logic apparatus determines an area of interest based on locationing data received from a global positioning system (GPS) unit incorporated therewith and receives weather data for this area of interest. The crane risk logic apparatus causes an alert notification at the crane to occur in response to presence of weather issues.

18 Claims, 5 Drawing Sheets

(56) References Cited

U.S. PATENT DOCUMENTS

| | | |
|---|---|---|
| 3,724,679 A | 4/1973 | Brownell et al. |
| 3,819,922 A | 6/1974 | Horn et al. |
| 3,870,160 A | 3/1975 | Hutchings |
| 3,913,081 A | 10/1975 | Hamilton |
| 4,003,487 A | 1/1977 | Downing |
| 4,039,084 A | 8/1977 | Shinohara et al. |
| 4,042,135 A | 8/1977 | Pugh et al. |
| 4,058,178 A | 11/1977 | Shinohara et al. |
| 4,185,280 A | 1/1980 | Wilhelm |
| 4,187,681 A | 2/1980 | Johnson |
| 4,222,491 A * | 9/1980 | Geppert ................ B66C 23/905 212/276 |
| 4,251,059 A | 2/1981 | Fougea |
| 4,395,706 A | 7/1983 | Garber |
| 4,752,012 A | 6/1988 | Juergens |
| 5,160,055 A | 11/1992 | Gray |
| 5,711,440 A | 1/1998 | Wada |
| 6,536,615 B2 | 3/2003 | Nishikino et al. |
| 10,139,036 B2 | 11/2018 | Wiethorn |
| 2005/0247657 A1* | 11/2005 | Sparenborg ........... B66C 19/002 212/325 |
| 2007/0284327 A1* | 12/2007 | Gonzalez ................ B66C 13/08 212/242 |
| 2010/0012610 A1* | 1/2010 | Rudy .................... B66C 23/905 212/270 |
| 2011/0062104 A1* | 3/2011 | Schneider ............. B66C 15/065 212/276 |
| 2012/0138392 A1* | 6/2012 | Anasis ...................... E04G 3/32 187/298 |
| 2014/0164039 A1* | 6/2014 | Mitti ................ G06Q 10/06311 705/7.14 |
| 2015/0042479 A1* | 2/2015 | Muetzel .................. G01W 1/10 340/601 |
| 2015/0123476 A1* | 5/2015 | Mesia ....................... H02J 1/10 307/29 |
| 2016/0200553 A1* | 7/2016 | Sorensen .............. B66C 23/185 212/273 |
| 2017/0076233 A1* | 3/2017 | Finn ....................... G06Q 50/08 |
| 2017/0260028 A1* | 9/2017 | Verheyen ................ B66C 17/00 |
| 2018/0057319 A1* | 3/2018 | Hirate .................... B66C 15/00 |
| 2018/0218303 A1* | 8/2018 | Cole ..................... G06F 40/279 |
| 2018/0346294 A1* | 12/2018 | Shely ..................... B66C 13/16 |
| 2019/0031474 A1* | 1/2019 | Stilborn ................. B66C 13/16 |
| 2019/0241408 A1* | 8/2019 | Strahl ................... B66C 15/065 |
| 2020/0255267 A1* | 8/2020 | Wong .................... B66C 15/00 |
| 2020/0361751 A1* | 11/2020 | Persico .................. B66C 17/00 |

* cited by examiner

CRANE RISK LOGIC APPARATUS AND SYSTEM AND METHOD FOR USE OF SAME

PRIORITY STATEMENT & CROSS-REFERENCE TO RELATED APPLICATIONS

This application claims priority from U.S. Patent Application Ser. No. 62/879,928 entitled "Crane Service Apparatus and System and Method for Use of Same" filed on Jul. 29, 2019, in the name of Jim D. Wiethorn; which is hereby incorporated by reference for all purposes.

TECHNICAL FIELD OF THE INVENTION

This invention relates, in general, to cranes and, in particular, to a crane risk logic apparatus and system and method for use of the same for mobile cranes, tower cranes, and the like, that enable crane owners, operators, and manufacturers to provide a means to evaluate potential known risks to avoid catastrophic events and protect workers.

BACKGROUND OF THE INVENTION

Without limiting the scope of the invention, the background will be described with reference to crane accidents, as an example. Crane accidents and operational issues are very dramatic and very visible, often resulting in viral videos and media attention. Worse, crane accidents may cause property damage, injury, and even death. Crane accident research data, consensus national standards and state and local municipalities prescribe certain safety practices and equipment to enable safe operating procedures. Crane operations employ an internal computing device referred to as Load Moment Indicators (LMI) or Load Limiting Indicators (LLI), as they may be referred, to provide assistance to the operator to safely and properly use the equipment as intended. The LMI monitors and stores/documents operational data that is critical to safe operations. Crane Risk Logic (CRL) uses an analysis of stored data to track the usage of the crane while performing risk assessment of the operator and operations. By collecting and analyzing crane operation data high risk conditions are identified in order divert disaster. Accordingly, there is a need for improved systems and methods to achieve these ends through CRL.

SUMMARY OF THE INVENTION

It would be advantageous to mitigate the risks of mobile and tower cranes. It would also be desirable to enable a computer-based and mechanical-based solution that is easily and quickly deployed without the need for a complex technical analysis. To better address one or more of these concerns, a CRL apparatus for cranes, and the like, and systems and methods for use of the same are disclosed. In one embodiment of the CRL apparatus, the CRL apparatus is integral with, and located in, mobile and tower cranes which communicates with a load moment indicator. The CRL apparatus receives crane data from the load moment indicator and determines levels of lift cycle data therefrom. The CRL apparatus documents LMI data associated with operating outside proper operating parameters set by the owner such as severe lift cycles at low boom angles. The CRL apparatus determines an area of interest based on locationing data received from a global positioning system unit incorporated therewith and receives weather data for this area of interest. The CRL apparatus causes an alert notification at the crane to occur in response to presence of weather issues, including maximum wind allowables. The CRL apparatus activates a visual and audible alarm outside the cab in the event the computer is overridden. A system and method, which accompany the CRL apparatus, are also disclosed. This CRL apparatus, along with the system and method and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Figure 1:
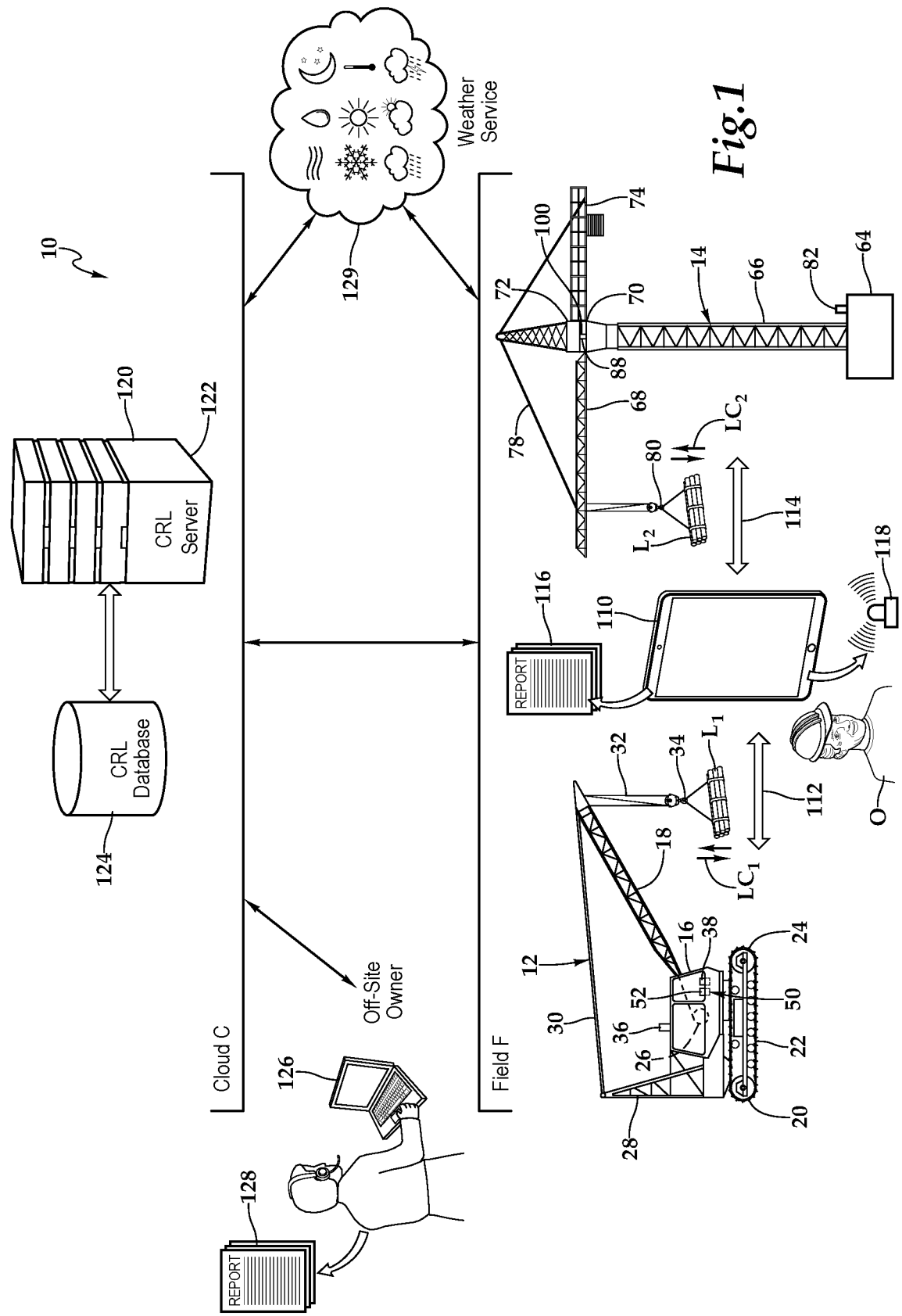
FIG. 1 is a schematic block diagram depicting one embodiment of a system utilizing CRL apparatuses on multiple cranes, according to the teachings presented herein.

Referring initially to FIG. 1, therein is depicted one embodiment of a system for providing CRL that is schematically illustrated and generally labeled 10. A crawler crane 12 and a tower crane 14 are positioned in field F at a job site. It should be appreciated that although a crawler crane and a tower crane are depicted, the teachings presented herein work with any type of crane. As shown, the crawler crane 12 includes a crane body 16 having a boom 18 mounted thereto so as to be hoisted and lowered. Additionally, a lower undercarriage 20 with a set of parallel tracks 22 having endless treads 24 provide stability and mobility to the crawler crane 12. A winch 26 is also secured to the crane body 16 to drive the boom 18 to be hoisted and lowered through a gantry 28 and boom hoist assembly 30. A hoist cable 32 is drawn out of the winch 26 along the boom 18 and is suspended from the extreme end of the boom 18 to suspend a hook 34 suspended by many cables. By the hoist means constituted as described above, the main winding and hoisting work for raising and lowering mainly a very heavy load $L_1$, depicted as beams, at a low speed with each lift and lowering being a lift cycle $LC_1$. Safety features, such as a siren 36 mounted on the top of the crane body 16, provide various notifications and precautions to improve safety when the LMI is overridden.

A load moment indicator 38 is secured to the crawler crane 12 to monitor crane functions to provide an operator of the crawler crane 12 with a continuous reading of a rated capacity of the crawler crane 12 as the crawler crane 12 and the boom 18 move through motions to make a lift of the load $L_1$ to complete a lift cycle $LC_1$. The severity of a load cycle is based on the relationship of the load weight to the allowable load permitted by the load chart and expressed as a percent capacity. The CRL 10 details the severity of each cycle based on the percent capacity of each cycle. A CRL apparatus 50 having a housing 52 is located integral with the crawler crane 12 and located in communication with the load moment indicator 38. As will be discussed in further detail hereinbelow, the CRL apparatus 50 collects crane data for monitoring and reporting purposes, maintains the location of the crawler crane, and monitors weather conditions.

The tower crane 14 includes a base 64 with mast 66 extending therefrom. A jib 68 extending horizontally to the mast 66 so as to rotate in a horizontal plane under the power of a slewing unit 70 positioned on top of the mast 66. An operating cabin 72 sits above the slewing unit 70. A counter jib 74 holds counterweights, a hoist motor, a hoist drum, and electronics, for example, to drive the hoisting and the other functions. A hoist cable 78 is drawn out of the hoist motor of the counter jib 74 along the jib 68 and is suspended from a trolley (not shown) that travels along the jib 68 to suspend a hook 80 suspended by many cables. By the hoist means constituted as described above, the main winding and hoisting work for raising and lowering mainly a very heavy load $L_2$, depicted as beams, at a low speed takes place with each lift and lowering being a lift cycle $LC_2$. The severity of a load cycle is based on the relationship of the load weight to the allowable load permitted by the load chart and expressed as a percent capacity. The CRL 10 details the severity of each cycle based on the percent capacity of each cycle.

A load moment indicator 88 is secured to the tower crane 14 to monitor crane functions to provide an operator of the tower crane 14 with a continuous reading of a rated capacity of the tower crane 14 as the tower crane 14 and the jib 68 move through motions to make a lift of the load $L_2$ to complete a lift cycle $LC_2$. A CRL apparatus 100 is located integral with the tower crane 14 and located in communication with the load moment indicator 88. As will be discussed in further detail hereinbelow, the CRL apparatus 100 collects crane data for monitoring and reporting purposes, maintains the location of the crawler crane 12, and monitors weather conditions.

A smart device 110 is located in the field F proximate the crawler crane 12 and the tower crane 14. As shown, the smart device 110 is being utilized by an operator O. In one embodiment, the smart device 110 forms a pairing, such as pairing 112 or pairing 114, with one or each of the CRL apparatuses 50, 100 in order to facilitate monitoring and reporting purposes, maintain the location of the crawler crane 12, and monitor weather conditions. In particular, the smart device 110 may generate reports 116 or facilitate a notification, such as an alert 118. As shown, a CRL server 120 having a housing 122 and access to a CRL database 124 provides an interface and functionality to the field F, including the CRL apparatus 50 associated with the crawler crane 12 and the CRL apparatus 100 associated with the tower crane 14. An off-site owner 126 is located in communication with the services offered by the cloud C. The off-site owner 126 may run various reports 128 to give visibility into how the crawler crane 12 or the tower crane 14 are being operated in the field F. This can also identify any potential hazardous operations or abuse. Additionally, a weather service 129 provides weather forecasts, warnings of hazardous weather, and other weather-related services to the field F and the cloud C for the purposes of protection, safety, and general information. In one embodiment, the weather service 129 provides these weather-related services to organizations and general public. By way of example, and not by way of limitation, the US federal agency, the National Weather Service (NWS) or National Oceanic and Atmospheric Administration (NOAA), are such a service.

In one implementation, the on-site operator O at the field F utilizes the smart device 110 as part of a daily inspection program, wherein the smart device 110 offers an application that serves as a guide for conducting the daily inspection. The smart device 110 located in the cab may also be used by the operator O to facilitate monitoring and reporting purposes, maintain the location of the cranes, and monitor weather conditions. The smart device 110 transmits data to the cloud C that can be monitored by multiple parties. As previously mentioned, the smart device 110 is paired with each of the CRL apparatus 50 at crawler crane 12 and the CRL apparatus 100 at the crawler crane 14. The smart device 110 is also in communication with the services offered by the cloud C. The smart device 110 is also located in communication with the weather service 129 directly and/or through one of the CRL apparatuses 50, 100.

With respect to the daily inspection, as part of a safety protocol, each item that is reviewed and checked is submitted to the CRL server 120 and the CRL database 124 prior to obtaining any necessary signatures to begin operation. Any deficiencies may be sent to the off-site owner 126 for maintenance once the crane returns. In the event that a condition exists that is considered a safety issue, then the off-site owner 126 may send a mechanic or change out the crane or take other necessary action.

Once the inspection is complete and the information forwarded from the smart device 110 to the CRL server 120 to the off-site owner 126, the operator O will have all of the information gathered from not only the field F, but the office as well. Such information may include any special requirements, such as use of riggers, signal person, or a lift director. The operator O may confirm each item with the person in charge and have the appropriate ticket signed on the smart device 110 which confirms the start time for the job ticket and other confirmations. Obtaining signatures is too often difficult or not done, which causes significant litigation concerns. In one embodiment, each of the CRL apparatuses 50, 100 provide an override connection with a governor to the respective cranes that prevents operation until the ticket is signed and sent to the office to start operations. A second signature may be required when the project is finished. Once the final signature is obtained, the operator O may send the completed electronic document to the office and an invoice or time sheet for the day will be produced.

With respect to monitoring and reporting purposes, maintaining the location of the cranes, and monitoring weather conditions, in operation, each of the CRL apparatuses 50, 100 receives crane data and, in particular, LMI data, from the respective load moment indicators 38, 88 and determines lift cycle data therefrom. In general, lift cycles are the number of times that a crane is loaded at a particular boom angle, lifts the load, and then releases the load at a second boom angle. Lift cycles become very critical once the load is 80% of the allowable load. Therefore, in one implementation, the CRL apparatus 50, for example, and the smart device 110 interface with a load chart that forms a portion of the LMI data provided by the load movement indicator 38 at the crawler crane 12. The CRL apparatus 50 and the smart device 110, in combination, document all lift cycles with particular attention to lift cycles over certain limits that can be preset by the crane owner. By way of example, the CRL apparatus 50 and the smart device 110, in combination, may document all lift cycles over 50% of the allowable load with particular attention and documentation to the lift cycles at 80% to 90% of the allowable load and lift cycles over 90% of the allowable load. Precise documentation of the crane usage based on number and severity of lift cycles provides critical information for maintenance and inspection requirements.

In one embodiment, the CRL apparatus 50 and the smart device 110, in combination, determine an area of interest based on locationing data received from a global positioning system unit incorporated with the CRL apparatus 50 and receive weather data for this area of interest. The CRL apparatus 50 causes an alert notification at the crawler crane 12 to occur in response to presence of weather issues or wind limits. The area of interest may be within 20 miles of the field F or within 50 miles of the field F, for example. In one implementation, warnings may escalate as the distance between the weather issue and the field F decreases.

Each time wind speed increases by a factor of two, the pressure it exerts increases by a factor of four. Therefore, a crane working with a 12 mile-per-hour wind that suddenly increases to 24 mph has an instant load resistance increasing by four times. In one embodiment, anemometer readings are received from the weather service 129 for the area of interest and wind speed increases are monitored. In another embodiment, anemometer readings are received for the area of interest and wind speeds are monitored. In one implementation, the CRL apparatus 50 and the smart device 110, in combination, issue a notification if the wind speeds are in excess of 20 mph (32 kph), 25 mph (40 kph), or 30 mph (48 kph), based on the crane configuration and it corresponding limits. In one implementation, winds at 20 mph (32 kph) or 25 mph (40 kph) cause a warning and winds at 30 mph (48 kph) cause a stop work warning. The weather issues monitored may also include lightning warnings. The notifications and warnings generated by the CRL apparatus 50 or the smart device 110 may include notifications to the smart device 110, such as alert 118, or notifications and warnings through the safety features 36 of the crawler crane 12 or the safety features 82 of the tower crane 82.

Figure 2:
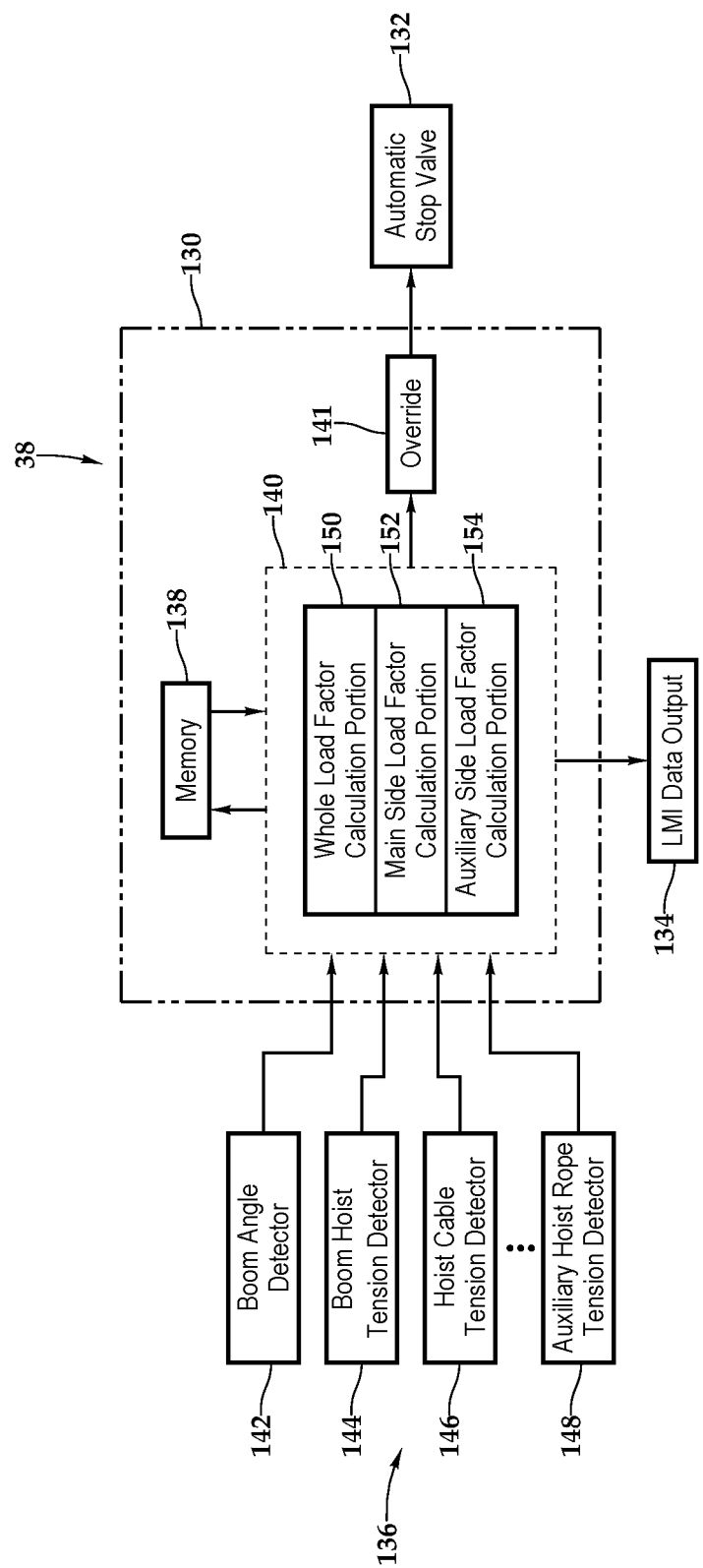
FIG. 2 is a functional block diagram depicting one embodiment of a load moment indicator shown FIG. 1, which may form a portion of the CRL apparatus.

Referring to FIG. 2, in one embodiment, the load moment indicator (LMI) 38 is constituted by a calculation processing portion 130, an automatic stop valve 132, an LMI data output 134, and one or more detectors 136. The calculation processing portion 130 may include a memory section 138, a load factor calculation section 140, and an override portion 141. Respective detectors 136 are provided and include, by way of example, a boom angle detector 142 for detecting a boom angle, a boom hoist load detector 144 as a whole hoist load detecting means for detecting a load (whole hoist load) of the boom hoist assembly 30 shown in FIG. 1, a hoist cable load detector 146 as a main winding hoist load detecting means for detecting a load (main side hoist load) of the hoist cable 32, and an auxiliary hoist rope load detector 148 as an auxiliary winding hoist load detecting means for detecting a load (auxiliary side hoist load) of auxiliary cabling and ropes. Detection values obtained by each of detectors 136 are input to the load factor calculation section 140. It should be appreciated that although a particular configuration of detectors is presented, other detector configurations are within the teachings presented herein.

In one embodiment, the load factor calculation portion 140 may include a whole load factor calculation portion 150, a main side load factor calculation portion 152, and an auxiliary side load factor calculation portion 154. The load factors, such as hoist load/rated load, relative to the whole, main side and auxiliary side are calculated by these calculation portions 150, 152, 154. When the load factor reaches a predetermined value, an overload is judged by the override portion 141, and a stop signal is then sent to the automatic stop valve 132, which may be a solenoid valve, for example, and the crane operation automatically stops. It should be appreciated that although one architecture of the load moment indicator 38 is provided, other architectures are within the teachings presented herein. It should be appreciated that the load moment indicator 88 may be similar in structure and function to the load moment indicator 38.

By way of example and not by way of limitation, the following table, Table I, provides exemplary data sets that are measured by the load moment indicator 38 and/or CRL apparatus 50.

TABLE I

| LMI Data & Crane Data | |
|---|---|
| Winch 1 | Load on the hook |
| | Winch in operation |
| | Raise or lowering Winch speed |
| Winch 2 | Load on the whip line |
| | Winch in operation |
| | Raise or lowering Winch speed |
| Boom angle | Angle of the boom |
| Luffing jib angle | Angle of the luffing jib |
| Interface with main line load chart | Load being lifted |
| | % capacity |
| | Overload condition |
| | Override warning |
| Interface with whip line chart | Load being lifted |
| | % capacity |
| | Overload condition |
| | Override warning |
| Wind speed | Anemometer reading |
| | Warning over 20 mph |
| | Warning over 25 mph |
| | Stop work over 30 mph |
| Anti-Two Block Activation | Date-Time of Activation |
| | Override notification |
| Lift Cycles | Take on Load % capacity of lift boom angle 1-Let off load % capacity lift boom angle 2 |
| Actual Load Allowable chart load | |
| [Most defining cycles are above 80% of the load] | |
| 50-80% | Cycles |
| 80-90% | Cycles |
| >90% | Cycles |

Figure 3:
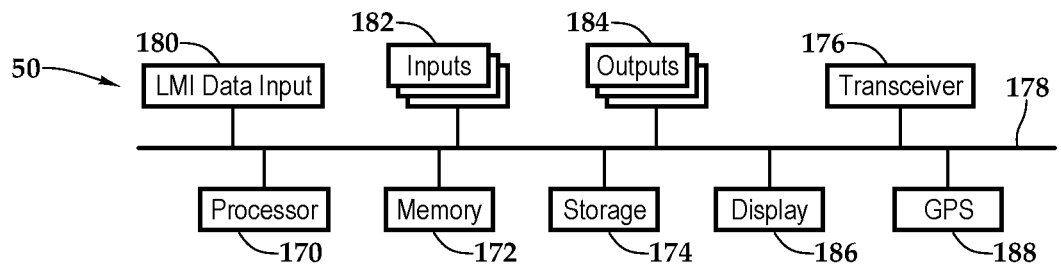
FIG. 3 is a functional block diagram depicting one embodiment of a CRL apparatus shown FIG. 1, according to the teachings presented herein.

Referring now to FIG. 3, within the housing 52, in one embodiment of the CRL apparatus 50, a processor 170, memory 172, storage 174, and one or more transceivers 176 are interconnected by a bus architecture 178 within a mounting architecture that supports an LMI data input 180, which is coupled to the LMI data output 134, inputs 182, outputs 184, a display 186, and a Global Positioning System (GPS) unit 188. It should be understood that the processor 170, the memory 172, the storage 174, the inputs 182, the outputs 184, the display 186, and the GPS 188 may be entirely contained within the housing 52 or a housing-smart device combination leveraging the smart device 110. The processor 170 may process instructions for execution within the computing device, including instructions stored in the memory 172 or in the storage 174. The memory 172 stores information within the computing device. In one implementation, the memory 172 is a volatile memory unit or units. In another implementation, the memory 172 is a non-volatile memory unit or units. The storage 174 provides capacity that is capable of providing mass storage for the CRL apparatus 50. Various inputs 182 and outputs 184 provide connections to and from the computing device, wherein the inputs 182 are the signals or data received by the CRL apparatus 50, and the outputs 184 are the signals or data sent from the CRL apparatus 50.

The one or more transceivers 176 are associated with the CRL apparatus 50 and communicatively disposed with the bus 178. As shown, the transceiver 176 may be internal, external, or a combination thereof to the housing. Further, the transceiver 176 may be a transmitter/receiver, receiver, or an antenna for example. Communication between various devices and the CRL apparatus 50 may be enabled by a variety of wireless methodologies employed by the transceiver 176, including 802.11, 3G, 4G, Edge, WiFi, ZigBee, near field communications (NFC), Bluetooth low energy and Bluetooth, for example. The display 186 provides an electronic device for the visual display of information. The GPS unit 188 accesses a global navigation satellite system that uses a receiver and algorithms to provide location, velocity and time synchronization to provide locationing information for the GPS unit 188, and, in turn, the CRL apparatus 50 and the crawler crane 12. It should be appreciated that although one architecture of the CRL apparatus 50 is provided, other architectures are within the teachings presented herein. Further, it should be appreciated that the CRL apparatus 100 is similar in structure and function to the CRL apparatus 50.

The memory 172 and the storage 174 are accessible to the processor 170 and include processor-executable instructions that, when executed, cause the processor 170 to execute a series of operations. In one embodiment of processor-executable instructions, the processor 170 is caused to receive the LMI data at the load moment indicator data input 180. The processor-executable instructions then cause the processor 170 to determine lift cycle data based on the received LMI data. The lift cycle data may include a number of lift cycles. In one embodiment, the lift cycle data is at least partially determined within the LMI data.

As previously mentioned, lift cycles become more critical once the load is 80% of the allowable. In one implementation, the system 10 documents all cycles over a certain limit, such as 50% of the allowable. Additional breakdowns on lift cycle count are provided for 80% to 90% and above 90%. The crane owner can leverage this information to set limits for loads lifted at low boom angles and a maximum number of lifts that reach a certain capacity. This information is accessible as an ongoing report and may include measures to halt operations that may lead to accidents or abuse of the crane.

The processor 170 is then caused to send the crane data, which includes the LMI data and the lift cycle data, to a server, such as the CRL server 120 that may be cloud-based. The processor 170 is then caused by the processor-executable instructions to determine an area of interest based on locationing data received from the global positioning system (GPS) unit 188. In one embodiment, the area of interest may be a 20-mile (32 kilometers) radius or 50-mile (80 kilometers) radius centered around the crane at the field F as delivered by the GPS unit 188. The processor 170 then receives weather data for the area of interest via the wireless transceiver. The weather data may include ongoing wind speed readings and lightning information as well as more general weather forecasting, weather watches, weather warnings, and weather information. The processor-executable instructions then cause the processor 170 to analyze the weather data for weather issues. The weather issues may include winds with speeds in excess of 20 mph (32 kph), 25 mph (40 kph), or 30 mph (48 kph), for example. In one implementation, winds at 20 mph (32 kph) or 25 mph (40 kph) cause a warning and winds at 30 mph (48 kph) cause a stop work warning. The weather issues may also include lightning warnings. The processor 170 is then caused to initialize an alert notification at the crane in response to presence of weather issues. The alert notification may include a notification on the smart device 110, a notification sent to the CRL server 120, a notification sent to the off-site owner 126, or a notification at the crane, including audiovisual alerts. The memory 172 may further include processor-executable instructions that, when executed, cause the processor 170 to capture and store the crane data and the weather data for analysis in an event of an incident occurring.

Figure 4:
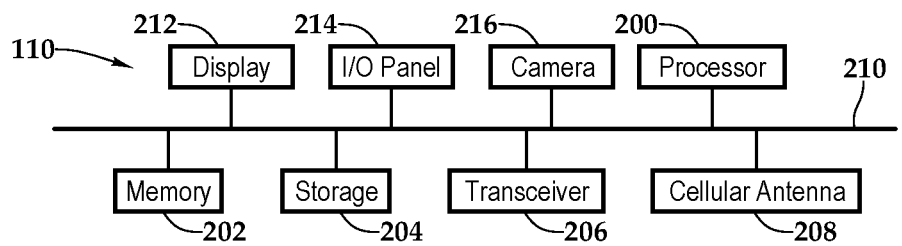
FIG. 4 is a functional block diagram depicting one embodiment of a smart device shown in FIG. 1, which may form a portion of the system.

Referring now to FIG. 4, the smart device 110 may be a wireless communication device of the type including various fixed, mobile, and/or portable devices. To expand rather than limit the discussion of the smart device 110, such devices may include, but are not limited to, cellular or mobile smart telephones, tablet computers, smartwatches, and so forth. The smart device 110 may include a processor 200, memory 202, storage 204, a transceiver 206, and a cellular antenna 208 interconnected by a busing architecture 210 that also supports a display 212, I/O panel 214, and a camera 216. It should be appreciated that although a particular architecture is explained, other designs and layouts are within the teachings presented herein.

In operation, the teachings presented herein permit the smart device 110 such as a smart tablet to communicate with the CRL apparatuses 50, 100 in order to facilitate monitoring and reporting purposes, maintaining the location of the cranes, and monitoring weather conditions. As shown, the smart device 110 includes the memory 202 accessible to the processor 200 and the memory 202 includes processor-executable instructions that, when executed, cause the processor 200 to form a pairing with one or more CRL apparatuses 50, 100. The processor-executable instructions may function to further many of the processes discussed with respect to the CRL apparatuses 50. By way of example, the processor 200 is caused to receive the crane data. The processor-executable instructions then cause the processor 200 to determine lift cycle data based on the received crane data. The lift cycle data may include a number of lift cycles. The processor 200 is then caused to send the crane data and the lift cycle data to a server, such as the CRL server 120 that may be cloud-based. The processor 200 is then caused by the processor-executable instructions to determine an area of interest based on locationing data received from the GPS unit 188 of the CRL apparatus 50. The processor 200 then receives weather data for the area of interest via the wireless transceiver. The processor-executable instructions then cause the processor 200 to analyze the weather data for weather issues. The processor 200 is then caused to initialize an alert notification at the crane in response to presence of weather issues.

In another embodiment of processor-executable instructions, the processor-executable instructions cause the processor 200 to provide an interface for an operator. The processor-executable instructions then cause the processor 200 to access data and resources at the CRL server 120 and the CRL database 124. The processor 200 is then caused to generate various reports. The processor-executable instructions may also cause the processor 200 to run an operational interface program that ensures the safe operation of the crane. The processor-executable instructions may also cause the processor 200 to operate an override connection with a governor of the crane that prevents operation until a ticket is signed and sent to the office to start operations. In one embodiment, following an occurrence of an incident, the processor-executable instructions cause a signal to be sent to the cloud C so that information and the data stored at the CRL database 124 about the crane is locked and only accessible by designated parties.

Figure 5:
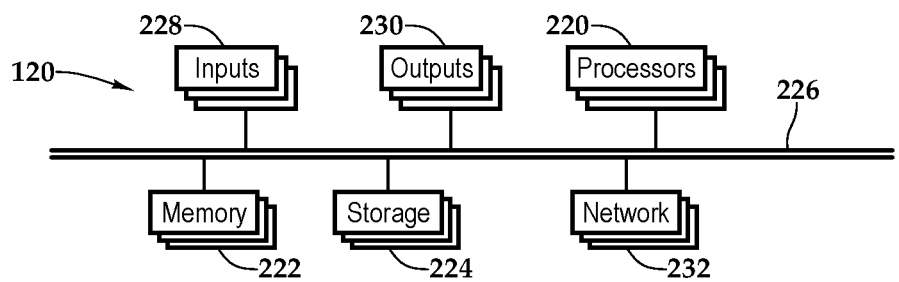
FIG. 5 is a functional block diagram depicting one embodiment of a server shown in FIG. 1, which may form a portion of the system.

Referring now to FIG. 5, one embodiment of the server 120 as a computing device includes, within the housing 122, a processor 220, memory 222, and storage 224 interconnected with various buses 226 in a common or distributed, for example, mounting architecture that also supports inputs 228, outputs 230, and network interface 232. In other implementations, in the computing device, multiple processors and/or multiple buses may be used, as appropriate, along with multiple memories and types of memory. Further still, in other implementations, multiple computing devices may be provided and operations distributed therebetween. The processor 220 may process instructions for execution within the server 120, including instructions stored in the memory 222 or in storage 224. The memory 222 stores information within the computing device. In one implementation, the memory 222 is a volatile memory unit or units. In another implementation, the memory 222 is a non-volatile memory unit or units. Storage 224 includes capacity that is capable of providing mass storage for the server 120, including CRL database storage capacity. Various inputs 228 and outputs 230 provide connections to and from the server 120, wherein the inputs 228 are the signals or data received by the server 120, and the outputs 230 are the signals or data sent from the server 120. The network interface 232 provides the necessary device controller to connect the server 232 to one or more networks.

The memory 222 is accessible to the processor 220 and includes processor-executable instructions that, when executed, cause the processor 220 to execute a series of operations. The processor-executable instructions cause the processor 220 to provide an interface for an off-site crane owner. The processor-executable instructions also cause the processor 220 to maintain the CRL database 124 in the storage 224. As discussed, the CRL database 124 may include information about the crane owner, a crane operator of the crane, and job information. The processor 220 is caused to receive the crane data and the lift cycle data from the CRL apparatus 50 and append the crane data to the CRL database 124. In one embodiment, following the receipt of a signal from the CRL apparatus 50 that an incident has occurred, the information and the data stored at the CRL database 124 about the crane is locked and only accessible by designated parties.

Figure 6:
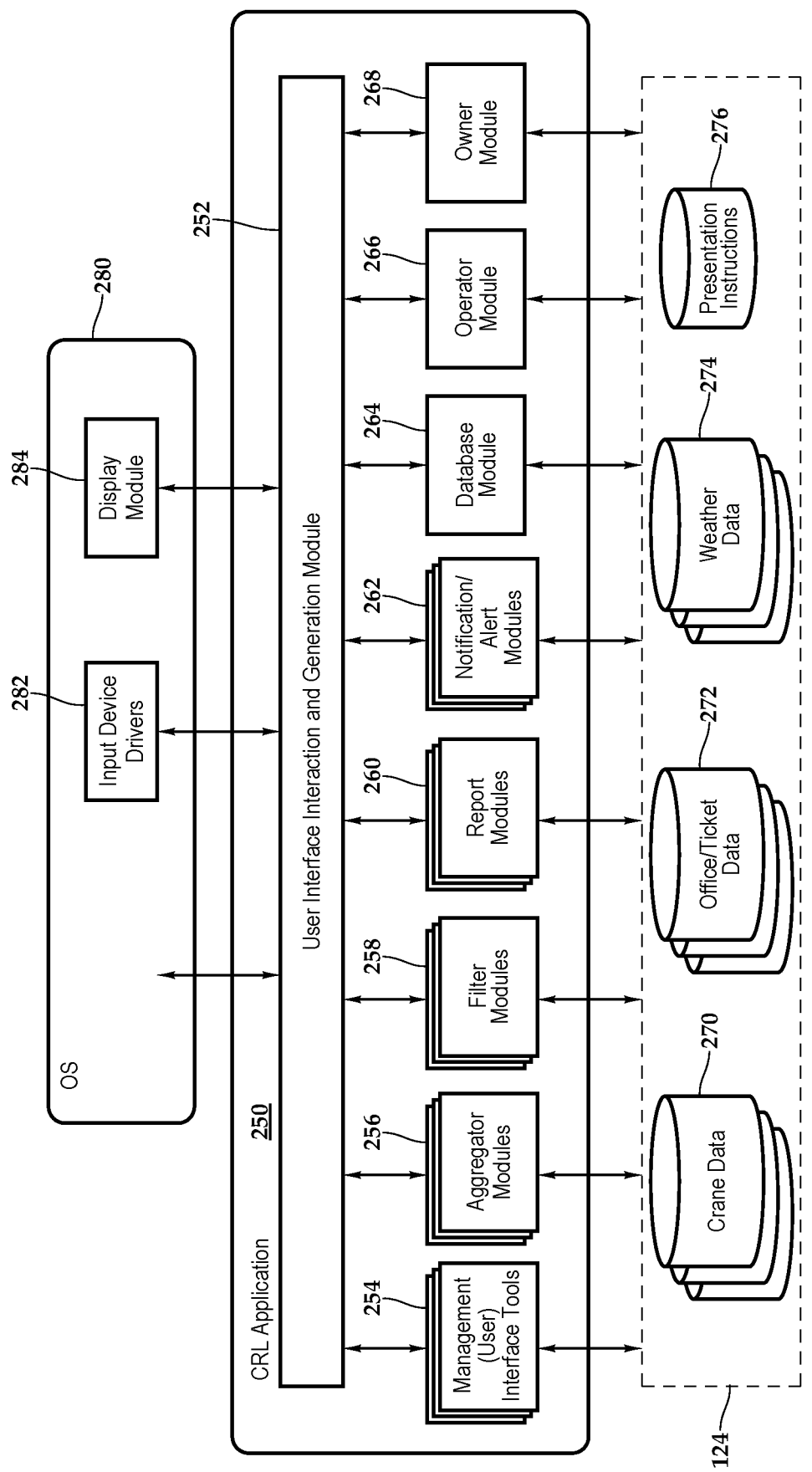
FIG. 6 is a conceptual module diagram depicting a software architecture of a CRL application of some embodiments.

FIG. 6 conceptually illustrates the software architecture of a CRL application 250 of some embodiments that may render information, such as the report 116 and the report 128, and notifications, such as the alert 118. In some embodiments, the CRL application 250 is a stand-alone application or is integrated into another application, while in other embodiments the application might be implemented within an operating system 280. Furthermore, in some embodiments, the CRL application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The CRL application 250 includes a user interface (UI) interaction and generation module 252, management (user) interface tools 254, aggregator modules 256, filter modules 258, report modules 260, notification/alert modules 262, database module 264, operator module 266, and an owner module 268. The CRL application 250 has access to the CRL database 124, which in one embodiment, may include crane data 270, office/ticket data 272, weather data 274, and presentation instructions 274, which presents instructions for the operation of the CRL application 250. In some embodiments, storages 270, 272, 274, 276 are all stored in one physical storage. In other embodiments, the storages 270, 272, 274, 276 are in separate physical storages, or one of the storages is in one physical storage while the other is in a different physical storage.

The CRL database 124, in one implementation, provides a database of all pertinent information required for crane lifts and historical information of the crane, owner, and operator. The crane data 270 may be all information concerning the make, model, and manufacturer of the crane as well as the date of manufacture. A copy of a current annual inspection/certification of the crane, a copy of all maintenance records, and documentation of the purchase of the crane, including current ownership information, may be included in the crane data 270. The office/ticket data 272 may include all the information of the operator assigned to the crane such as all experience and particularly certification documentation with a date of expiration. Recent "operator evaluation forms" may be included. The CRL server 120 may track the life and expiration of such forms and certificates to provide notifications prior to expiration when renewal is required. The office/ticket data 272 may also include information about job assignments, including having input data on specific questions based on limitation containment in accordance with applicable local, state, and national standards. Such job input information may also include the job ticket specifying a job number and job name assignment. An operator may be assigned to a job number and job name assignment and the smart device being utilized by the operator may be employed to answer a series of questions concerning the need for riggers, signal person, and/or lift director. Such information may be provided with a confirmation mechanism. The job input information may also include a description of the load, load weight and load radius, for example. The UI interaction and generation module 252 generates a user interface that allows the end user to specify parameters that may be utilized to generate various reports and notifications.

Once the parameters have been established for the generation of reports by default or by an end user utilizing the management (user) interface tools 254, the aggregator modules 256 and the filter modules 258 may be executed to analyze instances or summaries of LMI data and crane data gathered by the CRL application 250 by applying selected performance characteristic or selected performance characteristics to the instances of the LMI data and the crane data.

The report modules 260 may be executed to containerize and annotate the data elements to generate the required report or reports. The report modules 260 may also assist an investigator or owner in the event of incident occurring. The cloud C and, in particular, the CRL database 124 captures and stores all data, which can be used to generate various reports following an incident. In one implementation, following an incident, all of the data stored in the cloud C may be locked and only accessible by designated parties. Additionally, by way of example, the reports modules 260 may generate crane usage reports that allow an owner to determine actual hours of use for financial evaluation of each crane. By way of further example, the report modules 260 may also provide detailed records about the service times and hours of each crane. Such records may be an asset for insurances purposes and stored at a main office of the owner.

The notification/alert modules 262 may be executed to provide notifications of varying levels of urgency to the off-site owner 126 or the operator O at the field F, for example. The notifications and alerts may be weather related or job-site related or crane-related, for example. The database module 264 may be executed to obtain data from the CRL database 124. The operator module 266 provides the necessary interface or interfaces for the operator of the crane and, similarly, the owner module 268 provides the necessary interface or interfaces for the owner of the crane.

In the illustrated embodiment, FIG. 6 also includes an operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope or accelerometer, for example. A user may use one or more of these input devices 282, which send signals to their corresponding device driver, in combination with the display module 284 to interact with the CRL application 250. The device driver then translates the signals into user input data that is provided to the UI interaction and generation module 252.

More particularly, use of crawler cranes in congested urban areas and highly volatile refinery operations restricts the capability of the operator to lay a crawler crane's boom down during out-of-service periods such as overnight. Further, when high winds suddenly impact a site the time to properly prepare for lowering the boom is limited and often attempted under emergency conditions. The systems and methods presented herein meet the need for a specialized mechanism that provides additional knowledge about overturning by monitoring LMI data and crane data. Further, the systems and methods presented herein provide time, by actively monitoring weather conditions based on location, to execute lowering procedures and other safety measures. Tipping occurs when the wind forces on the boom creates sufficient load to overturn the crane over the front tips of the tracks. Safety measures can be taken in advance of high winds or lightning to prevent overturning or another weather-related incident from happening.

Figure 7:
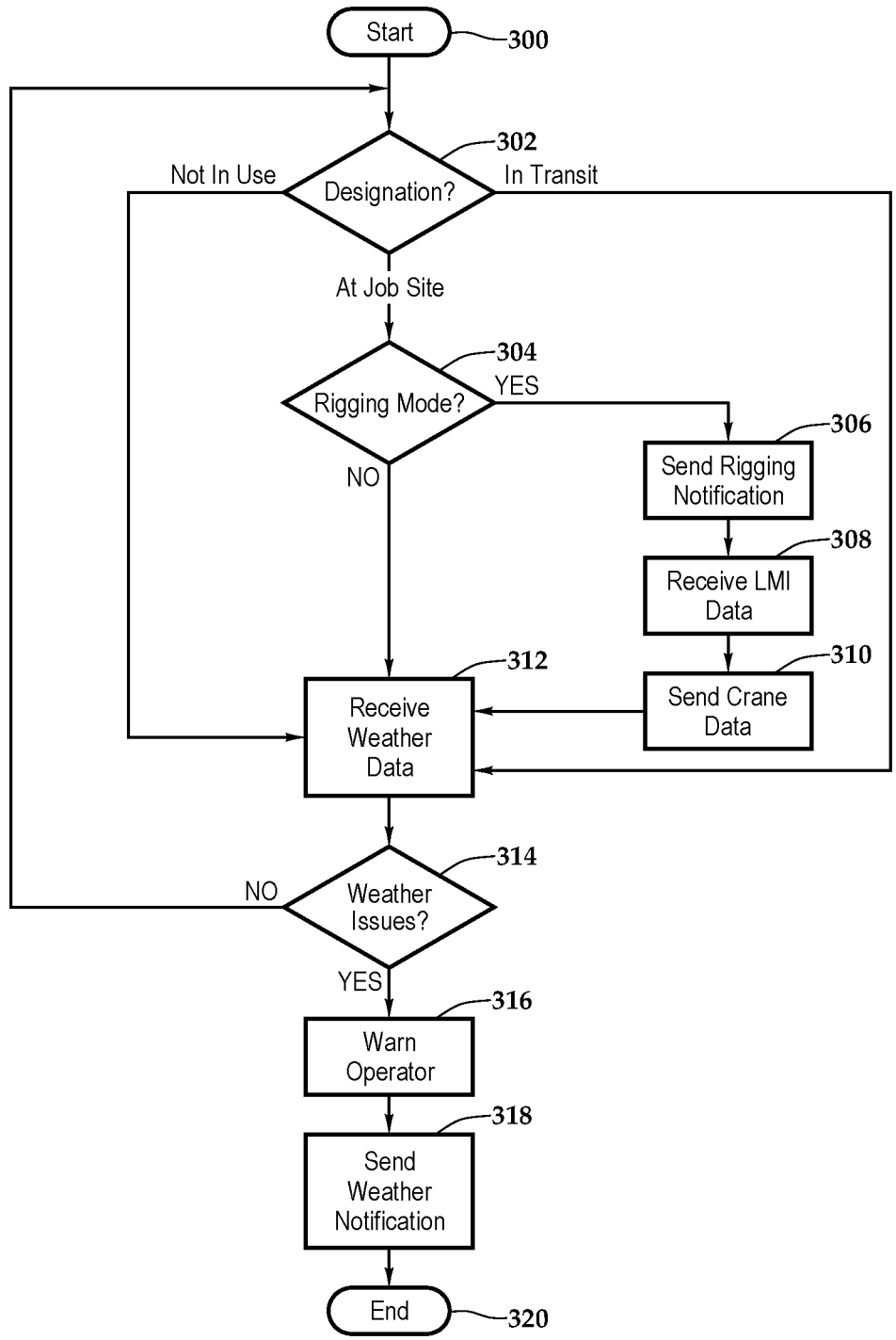
FIG. 7 is a flowchart depicting one embodiment of a method utilizing a CRL apparatus on a crane, according to the teachings presented herein.

Referring to FIG. 7, one embodiment of a method for utilizing a CRL apparatus on a crane is shown. The methodology starts at block 300 with the CRL apparatus located on a crane and in communication with a cloud-based CRL server having access to a CRL database. Additionally, a weather service is in communication with each of the CRL apparatus and the cloud-based CRL server. At decision block 302, a designation of the crane and the CRL apparatus is determined. The crane and the CRL apparatus may be "Not In Use," "At Job Site," or "In Transit." A GPS unit associated with the CRL application 250 determines location and provides input into the status of the apparatus, which informs what notifications, if any, should be sent. With respect to the designation "At Job Site," the methodology advances to decision block 304. The designation "At Job Site" means the crane's presence at the work site has been arranged and on-site responsibilities will be executed, such as ensuring the crane is operating according to manufacturer's requirements and the worksite regulations, ensuring the crane is in proper operating condition by verifying proper documentation has been received from the crane owner and frequent inspections are performed, and verifying the crane has sufficient capacity to perform the work, for example.

At decision block 304, if the crane is in rigging mode and prepared for lifting then the methodology advances to block 306, where a rigging notification is sent to the CRL server. At block 308, the CRL apparatus receives LMI data, which the CRL apparatus sends to the CRL server at block 310. In one embodiment, the CRL apparatus obtains the number of lift cycles from the LMI data. More generally, at block 310, crane data is sent from the CRL apparatus to the CRL server. The CRL server makes substantially real-time and current crane data available for analysis so crane function and operation can be established in real-time in order to divert improper or inaccurate claims by others. The methodology then advances to block 312.

Briefly returning to decision block 302, if the designation is "Not In Use" or "In Transit" then the methodology also advances to block 312. A crane that is "Not In Use" may be in storage at the crane yard and awaiting deployment. A crane that is "In Transit" is located between the crane yard and the job site and in transit thereto. At block 312, the CRL apparatus receives weather data from the weather service. The CRL apparatus utilizes its GPS unit for locationing information and determining an area of interest for the weather inquiry. The weather data may provide weather information for an area of interest including the crane. In one embodiment, the area of interest may include 20-mile (32 kilometer) to 50-mile (80 kilometer) radius centered around the crane. At block 314, if there are no weather issues then the methodology returns to decision block 302. On the other hand, if there are weather issues, then the methodology advances to block 316, where the crane operator and site are warned of the weather issues. The weather issues may include winds with speeds in excess of 20 mph (32 kph), 25 mph (40 kph), or 30 mph (48 kph), for example. The weather issues may include lightning strike information. In one implementation, winds at 20 mph (32 kph) or 25 mph (40 kph) cause a warning and winds at 30 mph (48 kph) cause a stop work warning. The weather warning may include an audio alert, a visual alert, a combination of audio alerts and visual alerts, as well as weather warnings sent to the smart device being used by the on-site crane operator. At block 318, weather notifications are sent to the CRL server, which may take additional steps such as making an entry in the CRL database or sending a notification to the off-site crane owner. At block 320, the methodology concludes.

In the event an accident occurs the operator of the CRL activates an incident button that immediately stores all current data accumulated during lifting operations to a restricted port in the cloud. CRL data can be retrieved and concise information is available for determining causation.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for servicing a crane, the system comprising:
    a crane risk logic apparatus integral with the crane, the crane risk logic apparatus including:
        a housing securing a load moment indicator input, a processor, memory, a global positioning system unit, and a wireless transceiver thereat, the load moment indicator input being configured to interface with a load moment indicator secured to the crane and receive crane data therefrom;
        a busing architecture communicatively interconnecting the load moment indicator input, the processor, the memory, the global positioning system unit, and the wireless transceiver;
        the memory accessible to the processor, the memory including processor-executable instructions that, when executed, cause the processor to:
            receive the crane data at the load moment indicator input,
            determine lift cycle data based on the received crane data,
            send the crane data and the lift cycle data to a server,
            determine an area of interest based on locationing data received from the global positioning system unit, the area of interest including a position of the crane,
            receive weather data for the area of interest via the wireless transceiver,
            analyze the weather data for weather issues, and
            initialize an alert notification at the crane in response to presence of weather issues; and
    the server located remote to the crane, the server including:
        a housing securing inputs, outputs, a processor, memory, storage, and a network interface therein,
        a busing architecture communicatively interconnecting the inputs, outputs, the processor, the memory, the storage, and the network interface,
        the memory accessible to the processor, the memory including processor-executable instructions that, when executed, cause the processor to:
            provide an interface for an off-site crane owner,
            maintain a crane risk logic database in the storage, the crane risk logic database including information about the crane owner, a crane operator of the crane, and job information,
            receive the crane data and the lift cycle data from the crane risk logic apparatus, and
            append the crane data to the crane risk logic database.

2. The system as recited in claim 1, wherein the memory of the crane risk logic apparatus further includes processor-executable instructions that, when executed, cause the processor to capture and store the crane data and the weather data for analysis in an event of an incident occurring.

3. The system as recited in claim 1, the crane being a crawler crane.

4. The system as recited in claim 1, the crane being a tower crane.

5. The system as recited in claim 1, wherein the crane risk logic apparatus further comprises a pairing with a proximate smart device.

6. The system as recited in claim 1, wherein the load moment indicator monitors crane functions to provide an operator of the crane with a continuous reading of a rated capacity of the crane as the crane moves through motions to make a lift.

7. The system as recited in claim 1, wherein the crane data further comprises data selected from the group consisting of crane geometrical data, main boom length, main boom angle, jib angle, jib length, operating mode, and weight of load on a hook of the crane, and the total weight being lifted by the crane.

8. The system as recited in claim 1, wherein the crane data further comprises the lift cycle data.

9. The system as recited in claim 1, wherein the lift cycle data further comprises a number of lift cycles.

10. The system as recited in claim 1, wherein the memory of the crane risk logic apparatus further includes processor-executable instructions that, when executed, cause the processor to send the lift cycle data to a server.

11. The system as recited in claim 1, wherein the memory of the crane risk logic apparatus further includes processor-executable instructions that, when executed, cause the processor to receive the weather data for the area of interest via the wireless transceiver from a weather service.

12. The system as recited in claim 1, wherein the area of interest further comprises a 50-mile (80 kilometer) radius centered around the crane.

13. The system as recited in claim 1, wherein the weather issues further comprise winds with speeds in excess of a speed selected from the group consisting of 20 mph (32 kph), 25 mph (40 kph), and 30 mph (48 kph).

14. The system as recited in claim 1, wherein the processor-executable instructions to initialize an alert notification at the crane in response to the presence of weather issues further comprise processor-executable instructions that, when executed, cause the processor to active an audible alert at the crane.

15. The system as recited in claim 1, wherein the processor-executable instructions to initialize an alert notification at the crane in response to the presence of weather issues further comprise processor-executable instructions that, when executed, cause the processor to active visual alert at the crane.

16. The system as recited in claim 1, wherein the server is a cloud-based server servicing a plurality of crane risk logic apparatuses.

17. A system for servicing a crane, the system comprising:
    a crane risk logic apparatus positioned at the crane, the crane risk logic apparatus including:
        a housing securing a load moment indicator input, a processor, memory, a global positioning system unit, and a wireless transceiver thereat, the load moment indicator input being configured to interface with a load moment indicator secured to the crane and receive crane data therefrom;

a busing architecture communicatively interconnecting the load moment indicator input, the processor, the memory, the global positioning system unit, and the wireless transceiver;

the memory accessible to the processor, the memory including processor-executable instructions that, when executed, cause the processor to:

receive the crane data at the load moment indicator input, determine lift cycle data based on the received crane data, send the crane data and the lift cycle data to a server, determine an area of interest based on locationing data received from the global positioning system unit, the area of interest including a position of the crane, receive weather data for the area of interest via the wireless transceiver, analyze the weather data for weather issues, and initialize an alert notification at the crane in response to presence of weather issues; and the server located remote to the crane, the server including:

a housing securing inputs, outputs, a processor, memory, storage, and a network interface therein, a busing architecture communicatively interconnecting the inputs, outputs, the processor, the memory, the storage, and the network interface, the memory accessible to the processor, the memory including processor-executable instructions that, when executed, cause the processor to:

provide an interface for an off-site crane owner, maintain a crane risk logic database in the storage, the crane risk logic database including information about the crane owner, a crane operator of the crane, and job information, receive the crane data and the lift cycle data from the crane risk logic apparatus, and append the crane data to the crane risk logic database.

18. A system for servicing a crane, the system comprising:

a crane risk logic apparatus positioned at the crane, the crane risk logic apparatus including:

a housing securing a load moment indicator input, a processor, memory, a global positioning system unit, and a wireless transceiver thereat, the load moment indicator input being configured to interface with a load moment indicator secured to the crane and receive crane data therefrom;

the wireless transceiver configured to pair with a proximate smart device;

a busing architecture communicatively interconnecting the load moment indicator input, the processor, the memory, the global positioning system unit, and the wireless transceiver;

the memory accessible to the processor, the memory including processor-executable instructions that, when executed, cause the processor to:

receive the crane data at the load moment indicator input, determine lift cycle data based on the received crane data, send the crane data and the lift cycle data to a server, determine an area of interest based on locationing data received from the global positioning system unit, the area of interest including a position of the crane, receive weather data for the area of interest via the wireless transceiver, analyze the weather data for weather issues, and initialize an alert notification at the crane in response to presence of weather issues; and the server located remote to the crane, the server including:

a housing securing inputs, outputs, a processor, memory, storage, and a network interface therein, a busing architecture communicatively interconnecting the inputs, outputs, the processor, the memory, the storage, and the network interface, the memory accessible to the processor, the memory including processor-executable instructions that, when executed, cause the processor to:

provide an interface for an off-site crane owner, maintain a crane risk logic database in the storage, the crane risk logic database including information about the crane owner, a crane operator of the crane, and job information, receive the crane data and the lift cycle data from the crane risk logic apparatus, and append the crane data to the crane risk logic database.

\* \* \* \* \*